(12) United States Patent
Parida (10) Patent No.: US 12,542,641 B2
(45) Date of Patent: Feb. 3, 2026

(54) SINGLE-THREAD DETECTION OF VALID SYNCHRONIZATION HEADERS (71) Applicant: AyDeeKay LLC, Aliso Viejo, CA (US)

(72) Inventor: Rakhel Parida, Aliso Viejo, CA (US)

(73) Assignee: AyDeeKay LLC, Aliso Viejo, CA (US)

( * ) Notice: Subject to any disclaimer, the term of this patent is extended or adjusted under 35 U.S.C. 154(b) by 374 days.

(21) Appl. No.: 18/126,856

(22) Filed: Mar. 27, 2023

(65) Prior Publication Data

US 2023/0318788 A1 Oct. 5, 2023

Related U.S. Application Data (60) Provisional application No. 63/326,785, filed on Apr. 1, 2022.

(51) Int. Cl.
*H04L 5/00* (2006.01)
*H04W 56/00* (2009.01)

(52) U.S. Cl.
CPC ....... *H04L 5/0053* (2013.01); *H04W 56/0015* (2013.01)

(58) Field of Classification Search
None
See application file for complete search history.

(56) References Cited

U.S. PATENT DOCUMENTS

| | | | | |
|---|---|---|---|---|
| 6,363,066 B1 * | 3/2002 | Frimodig | ............ | H04L 12/4135 710/110 |
| 10,439,840 B1 | 10/2019 | Elend et al. | | |
| 2002/0101884 A1 * | 8/2002 | Pohlmeyer | .............. | H04L 7/044 370/510 |
| 2007/0291887 A1 * | 12/2007 | Ishimoto | ................. | H04L 25/40 375/371 |
| 2012/0117287 A1 | 5/2012 | Kashima | | |
| 2013/0145084 A1 | 6/2013 | Hiromatsu et al. | | |
| 2020/0274734 A1 * | 8/2020 | Antonsson | ............ | H04L 1/0083 |
| 2023/0053564 A1 * | 2/2023 | Dvorak | ................. | G06F 13/385 |

OTHER PUBLICATIONS

PCT Patent Appl. Serial No. PCT/US23/017211, International Search Report and Written Opinion, Jun. 23, 2023.

* cited by examiner

*Primary Examiner* — Ayman A Abaza
*Assistant Examiner* — Camquyen Thai
(74) *Attorney, Agent, or Firm* — Steven Stupp (57) ABSTRACT An integrated circuit with an interface circuit is described. During operation, the interface circuit may receive signals corresponding to a header of a frame that is compatible with a serial communication protocol, where the received signals include a temporal pattern of binary bits with instances of a dominant signal level and a recessive signal level. Then, the interface circuit may compute a set of conditions based at least in part on the receive signals, where, when valid, the set of conditions identify a first dominant bit in the binary bits having the dominant signal level. Moreover, when the set of conditions are valid, the interface circuit may: determine a location of synchronization field in the header relative to the identified first dominant bit; and calculate a baud rate of the receive signals based at least in part on a subset of the binary bits in the synchronization field.

20 Claims, 10 Drawing Sheets

SINGLE-THREAD DETECTION OF VALID SYNCHRONIZATION HEADERS

CROSS REFERENCE TO RELATED APPLICATIONS

This application claims priority under 35 U.S.C. 119(e) to U.S. Provisional Application Ser. No. 63/326,785, entitled "Single-Thread Detection of Valid Synchronization Headers," by Rakhel Parida, filed on Apr. 1, 2022, the contents of both of which are herein incorporated by reference.

FIELD

The present disclosure relates to techniques for communicating using a serial communication protocol.

BACKGROUND

Figure 1:
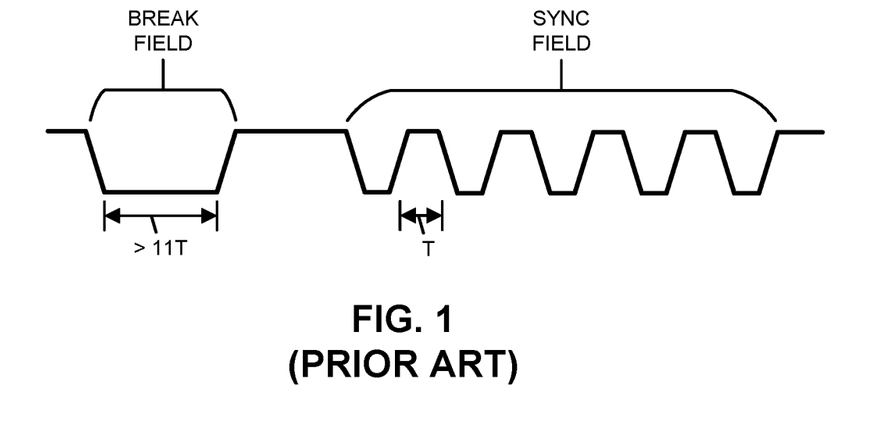
FIG. 1 is a timing diagram illustrating an example of an existing break field and synchronization (break+synch) field in a frame that is compatible with a Local Interconnect Network (LIN) communication protocol.

In serial communication, a recipient electronic device (which is sometimes referred to as a 'slave') that supports autobaud may need to extract a baud rate from a synchronization header in a frame. The synchronization header is typically constrained by the communication protocol to guarantee detection or identification of an incorrectly interpreted synchronization header without losing a valid synchronization header. For example, Local Interconnect Network (LIN) is a single-wire serial communication protocol used for communication between components in a vehicle. The LIN specification expects a slave to always detect a 'break and synchronization' (or 'break+sync') sequence or field in the synchronization header, which is transmitted by another electronic device (which is sometimes referred to as a 'master'). Moreover, a valid detection of the 'break+sync' field may result in or enable detecting the baud rate at which the master wants to communicate. Furthermore, the frames in LIN communication may be initiated by the master and the frame may begin with a break field followed by a synchronization byte field (which may, e.g., include eight synchronization bits). This sequence is unique in the LIN communication protocol and may guarantee that the slave detects the beginning of a new frame. FIG. 1 presents an example of an existing break field and synchronization (break+synch) field in a frame that is compatible with a LIN communication protocol.

However, if, for any reason, a slave becomes confused (e.g., about whether it is currently detecting a 'break+sync' field), then the slave may miss a valid 'break+sync' field that has a separate starting point or time. This undesired situation may also be caused by a transient short-circuit to ground. Notably, a short to ground can cause a dominant (or low) bit on the LIN bus for tens of milliseconds. This may confuse the slave, e.g., because an incorrect 'break' field may be detected and the subsequent real break may be confused as the start bit of the synchronization field.

In order to recover from such scenarios and to be able to detect a valid 'break+sync' field, a controller or control logic in a receiver circuit in a slave may start a thread with every dominant or extended low (e.g., '0') bit considered as a possible break field. Then, the controller may continue to validate the synchronization field unless the synchronization validation fails (in which case, the thread is freed or ended). From a hardware viewpoint, even though the maximum number of threads is a bounded problem, the cost of implementing a multi-threading approach may be significantly higher than a single-thread approach.

SUMMARY

Embodiments of an integrated circuit are described. This integrated circuit includes: an interface circuit for use with an electronic device. During operation, the interface circuit receives signals corresponding to a header of a frame that is compatible with a serial communication protocol, where the received signals include a temporal pattern of binary bits with instances of a dominant signal level and a recessive signal level. Then, the interface circuit computes a set of conditions based at least in part on the receive signals, where, when valid, the set of conditions identify a first dominant bit in the binary bits having the dominant signal level. Moreover, when the set of conditions are valid, the interface circuit: determines a location of synchronization field in the header relative to the identified first dominant bit; and calculates a baud rate of the receive signals based at least in part on a subset of the binary bits in the synchronization field.

Note that the serial communication protocol may include a Local Interconnect Network (LIN) communication protocol.

Moreover, the dominant signal level may be less than the recessive signal level.

Furthermore, the set of conditions may include a first instance of a first condition, where, when valid, the first instance of the first condition may include that a second dominant bit time of a second dominant bit in the binary bits having the dominant signal level is less than or equal to a first predefined multiple of a first dominant bit time of the first dominant bit and the first dominant bit may precede the second dominant bit. For example, the first predefined multiple may include 1.25. Alternatively, the set of conditions may include a second condition, and, when valid, the second condition may include that a sum of the second dominant bit time and a first recessive bit time of a first recessive bit in the binary bits having the recessive signal level is greater than or equal to a second predefined multiple of the first dominant bit time. Note that the first recessive bit may be between the first dominant bit and the second dominant bit.

In some embodiments, the second predefined multiple includes a ratio of 2 and 11. Alternatively or additionally, the set of conditions may include a second instance of the first condition, where, when valid, the second instance of the first condition may include that a third dominant bit time of a third dominant bit in the binary bits having the dominant signal level is less than or equal to the first predefined multiple of the second dominant bit time of the second dominant bit, and the second dominant bit may precede the third dominant bit. Note that the set of conditions may include a third condition, where, when valid, the third condition may include that the third dominant bit time is greater than or equal to a third predefined multiple of the second dominant bit time.

Moreover, the third predefined multiple may include 0.75.

Alternatively or additionally, the set of conditions may include a fourth condition. When valid, the fourth condition may include that a sum of a second recessive bit time of a second recessive bit in the binary bits and the third dominant bit time is greater than or equal to the third predefined multiple of an average bit time of a pair of bits in the binary bits, and the sum is less than or equal to the first predefined multiple of the average bit time. Note that the third dominant bit may precede the second recessive bit, and the pair of bits may include the first recessive bit and a dominant bit selected from the group that includes the first dominant bit, the second dominant bit and the third dominant bit. In some embodiments, the first predefined multiple includes 1.25 and the third predefined multiple includes 0.75.

Another embodiment provides a vehicle that includes the integrated circuit.

Another embodiment provides a system that includes the integrated circuit.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method for selectively calculating a baud rate of received signals. This method includes at least some of the operations performed by the integrated circuit.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

Note that like reference numerals refer to corresponding parts throughout the drawings. Moreover, multiple instances of the same part are designated by a common prefix separated from an instance number by a dash.

DETAILED DESCRIPTION

An integrated circuit for use with an electronic device is described. This integrated circuit may include an interface circuit. During operation, the interface circuit may receive signals corresponding to a header of a frame that is compatible with a serial communication protocol, where the received signals include a temporal pattern of binary bits with instances of a dominant signal level and a recessive signal level. Then, the interface circuit may compute a set of conditions based at least in part on the receive signals, where, when valid, the set of conditions identify a first dominant bit in the binary bits having the dominant signal level. Moreover, when the set of conditions are valid, the interface circuit may: determine a location of synchronization field in the header relative to the identified first dominant bit; and calculate a baud rate of the receive signals based at least in part on a subset of the binary bits in the synchronization field.

By correctly identifying the location of the synchronization field and determining the baud rate, these circuit techniques may improve serial communication, e.g., using the LIN communication protocol. Notably, the circuit techniques may allow a recipient electronic device using a serial communication protocol to recover from an undesired state on a bus and to detect a valid synchronization header in a frame (such as a 'break+synchronization' sequence or field). Consequently, the circuit techniques may improve the reliability and performance of serial communication. Therefore, the circuit techniques may make communication by the electronic device more robust and reliable, and thus may facilitate the use of the integrated circuit in a wide variety of systems, electronic devices and applications, such as in a vehicle. For example, the integrated circuit may be used in assisted or automated (or self-) driving of a vehicle.

We now describe embodiments of the circuit techniques. The circuit techniques may allow an integrated circuit to selectively calculates a baud rate of receive signals. During operation, the integrated circuit may receive the signals corresponding to a header of a frame that is compatible with a serial communication protocol (such as the LIN communication protocol), where the received signals include a temporal pattern of binary bits with instances of a dominant signal level and a recessive signal level. Then, the integrated circuit may compute a set of conditions based at least in part on the receive signals, where, when valid, the set of conditions identify a first dominant bit in the binary bits having the dominant signal level. Moreover, when the set of conditions are valid, the integrated circuit may: determine a location of synchronization field in the header relative to the identified first dominant bit; and calculate the baud rate of the receive signals based at least in part on a subset of the binary bits in the synchronization field.

The disclosed circuit techniques may guarantee detection of valid synchronization headers in spite of an undesired state transition on a LIN bus.

As discussed previously, a slave may need to detect a 'break+sync' sequence or field in order to identify the start of a frame, as well as to subsequently determine or derive the baud rate of the current transmission. The LIN specification includes several conditions that can help a slave successfully detect the 'break+sync' sequence or field. Notably, the synchronization field (which is sometimes referred to as a 'sync field') will follow the break field. Moreover, the break field may have a width or duration that is at least 11 times the LIN bit time (thus there may be an upper bound on the length or duration of the break field. Such as in the LIN specification). (However, 11 is used as an illustrative example, and more generally, the width or duration may be M times the LIN bit time, where M is a non-zero integer.) In addition, while it is not included in the LIN specification, the sync field bits can be compared to each other based at least in part on the LIN specified tolerance.

Figure 2:
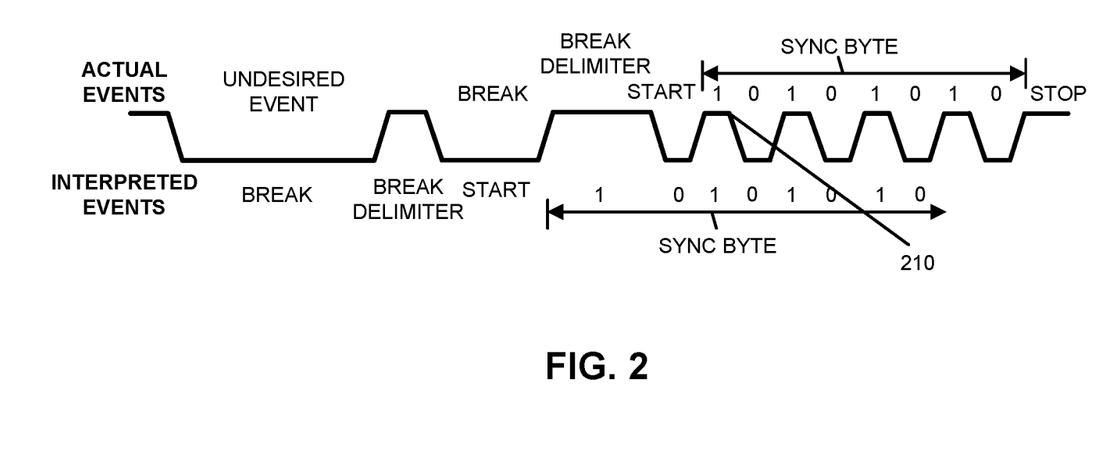
FIG. 2 is a timing diagram illustrating an example of a failure to detect a valid 'break+sync' sequence or field when there is an undesired event according to some embodiments of the present disclosure.

As expected in the LIN specification, a slave may detect the 'break+sync' sequence or field in a variety of circumstances. Indeed, integrated circuits that comply with the LIN specification are expected to guarantee detection of the 'break+sync' sequence or field in a wide variety of scenarios. For example, one unusual scenario may occur if a screwdriver shorts to the ground of the LIN bus while being used to replace a component. This short to ground appears as a dominant bit on the LIN bus and can have a random width or duration. If the dominant bit is long (e.g., 10 ms), and is followed by the actual or real break field (which should have a duration longer that 550 s for a 20 k baud rate), then the slave may become confused and may treat the short to ground pulse as a break field and the actual break field as the start bit of the sync field. In this scenario, the slave may assume that the sync byte (0x55) will follow with the least significant bit (LSB) first. Depending on the implementation, the start bit of the sync field may be ignored and two sync bits (one recessive and one dominant) may be used for comparison to check the validity of the 'break+sync' sequence or field. Notably, two consecutive or adjacent bits of the sync field may be used together for comparison in order to avoid the rise and fall time differences of the receive circuit in the slave. For this comparison, the slave may use the two-bit times relative to the break field in order to ensure that the break field is greater than or equal to 11 times the average sync-bit time or duration. Note that some integrated circuits may use the start bit (or dominant bit) and the first recessive bit (the least significant bit of the sync byte) of the sync field to perform the comparison. In either of the scenarios, the realization that the short to ground was not the break field will happen during the receiving of the sync field or byte. This is usually too late for the slave to go back to the actual break and to start considering it as the start of the 'break+sync' sequence or field. Consequently, in these scenarios, the slave may lose an entire frame. FIG. 2 presents a timing diagram illustrating an example of a failure to detect a valid 'break+sync' sequence or field when there is an undesired event.

In order to address these problems, the slave may use multi-threading. Notably, each dominant bit may be treated as if it is a break field and the subsequent bits may be evaluated as if they are part of the sync field. Moreover, the slave may keep validating the sync field against the assumed break field until a valid 'break+sync' field is received. When this occurs (and, thus, when the validation fails), the thread may be freed up for new detection. Because there are six dominant bits in the 'break+sync' field, the slave may need at least six threads to ensure that none of the dominant bits are missed in the break field.

Note that the multi-threading approaches may be implemented using multiple instances of a receive circuit in the slave. While incremental improvements may occur, the multi-threading approach may still need to start a new thread by assuming that each dominant bit is a potential break field.

Alternatively, in order to address the aforementioned problems, the slave may use an improved single thread. In these approaches, the slave may use one or more aspects or characteristics of the LIN communication protocol and predefined comparisons to achieve the desired result in a single thread. These approaches may provide reduced cost and complexity relative to the multi-threading approaches.

In the improved single-thread approaches, it may be important to optimize the receive circuit without compromising on the ability to detect occurrences of the 'break+sync' sequence or field. Moreover, in the single-thread approaches, one or more of the following aspects or characteristics of the LIN communication protocol may be used:
 the break field may always precede the sync field;
 in comparisons, a dominant bit may not be used alone as representing a LIN bit time.
(Notably, because the rise and fall time of the receive circuit can be significantly different, a dominant bit or recessive bit may be shorter or longer than expected. However, individual dominant bits may be used for comparison among themselves, because the rise and fall time differences in the receive circuit affects each dominant bit in the same way);
 the width or duration of the break field may be at least 11 times the average LIN bit time received during the sync field;
 the duration or width of a new pair of bits (a dominant bit and a recessive bit) of the sync field may stay within a predefined amount or range of two times the average bit time. (More generally, two times may be replaced by N times, where N is an even non-zero integer. For example, the predefined range may be ±25% or ±12.5% depending on the system requirements. More generally, the predefined range may be between 1+P and 1−P, where P is a decimal between 0 and 0.4);
 the dominant-bit comparisons may be subdivided in order to evaluate a potential break field when the 'break+sync; detection is failing in the same comparison cycle; and/or
 storage units may be used to hold previous or historical information in order to detect the valid 'break+sync' field and so that the autobaud detection may be optimized to use, e.g., two storage units or registers. (Note that the information in, e.g., two storage units, may be tracked by the same state machine that tracks the progress of the 'break+sync' field detection.)

Note that while the LIN communication protocol is used as an illustrative example in this discussion, the disclosed circuit techniques may be used with other serial communication protocols than the LIN communication protocol. Notably, the circuit techniques may be used with other serial communication protocols in which detection of a synchronization pattern is desired in order to avoid the loss of a frame.

As discussed previously, a LIN-compatible slave may support autobaud detection or determination. This capability allows the slave to derive or determine the baud rate (or bit rate) of transmission from the detected 'break+sync' field in the synchronization header of a frame. Moreover, the LIN specification bounds the sync bits to have a relation with the break field to help the slave detect a valid 'break+sync' field. The current LIN specification does not bound the maximum duration of the break field. This degree of freedom constraints a controller or control logic in or associated with a receive circuit in a slave to assume a dominant bit as break field and then proceed with validating the subsequent sync bits as they are received. However, when there is a short circuit, the resulting signal glitch may be assumed to a break field and the controller may proceed and validate the sync field. Thus, the glitch associated with a short circuit can be big enough to confuse the controller that the real or actual break is a sync bit. Consequently, in the process, the controller may lose the real or actual break and, thus, may lose the frame.

In some embodiments, 'break+sync' field detection is performed using a state-machine that keeps track of incoming LIN bits and continuously searches for a valid 'break+sync' field using predefined conditions, including:

$TLy+THy \geq 2/11 TLx,$   COND1:

$3/4 \text{ mean}(T) \leq Ty \leq 5/4 \text{ mean}(T),$   COND2:

$TLy \geq 3/4 TLx,$ and   COND3:

$TLy \leq 5/4 TLx,$   COND4:

where x is a previous dominant or recessive bit, y is a current dominant or recessive bit, TLx is a previous dominant bit time, TLy is a current dominant bit time, THy is a current recessive bit, Ty is the sum of TLy and THy or the sum of a recent dominant bit time and a recessive bit time, and mean(T) is the average two-bit time (one dominant bit and one recessive bit) of the previous pairs of bits in the sync field.

Note that COND1 may guarantee that the width or duration of the break field is at least 11 times one-half of the sum of the start bit plus the first least significant byte of the sync byte, which represents the LIN bit time. Moreover, COND2 may guarantee that the sync field bits are within a bounded or predefined range of one another. Furthermore, COND3 may compare the current dominant bit to the previous dominant bit, which ideally should have the same width and the inequality may be true when both the dominant bits are from the sync field. However, when this comparison is false (or not true), then it may be the case that the previous dominant bit x was a break field and the current dominant bit y may be the start bit of the sync field. Additionally, COND4 may compare the current dominant bit to the previous dominant bit, which ideally should have the same width and the inequality may be true when both the dominant bits are from the sync field. However, when this comparison is false (or not true), then it may be the case that the current dominant bit y is a break field.

Figure 3:
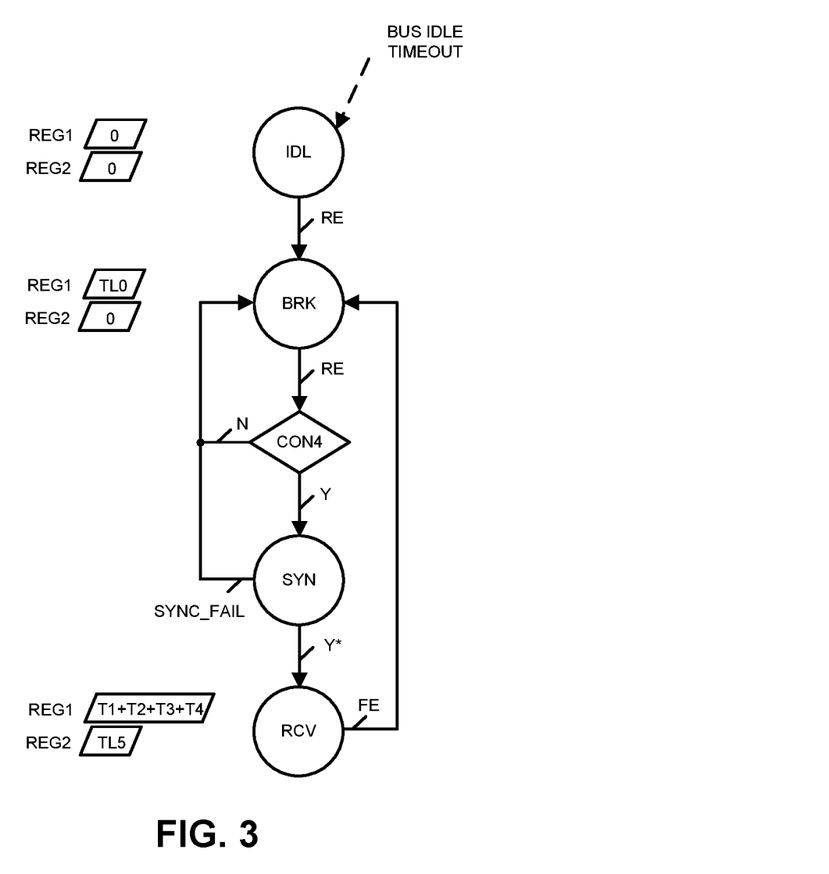
FIG. 3 is a drawing illustrating an example of a state machine with state transitions using predefined conditions according to some embodiments of the present disclosure.
Figure 4:
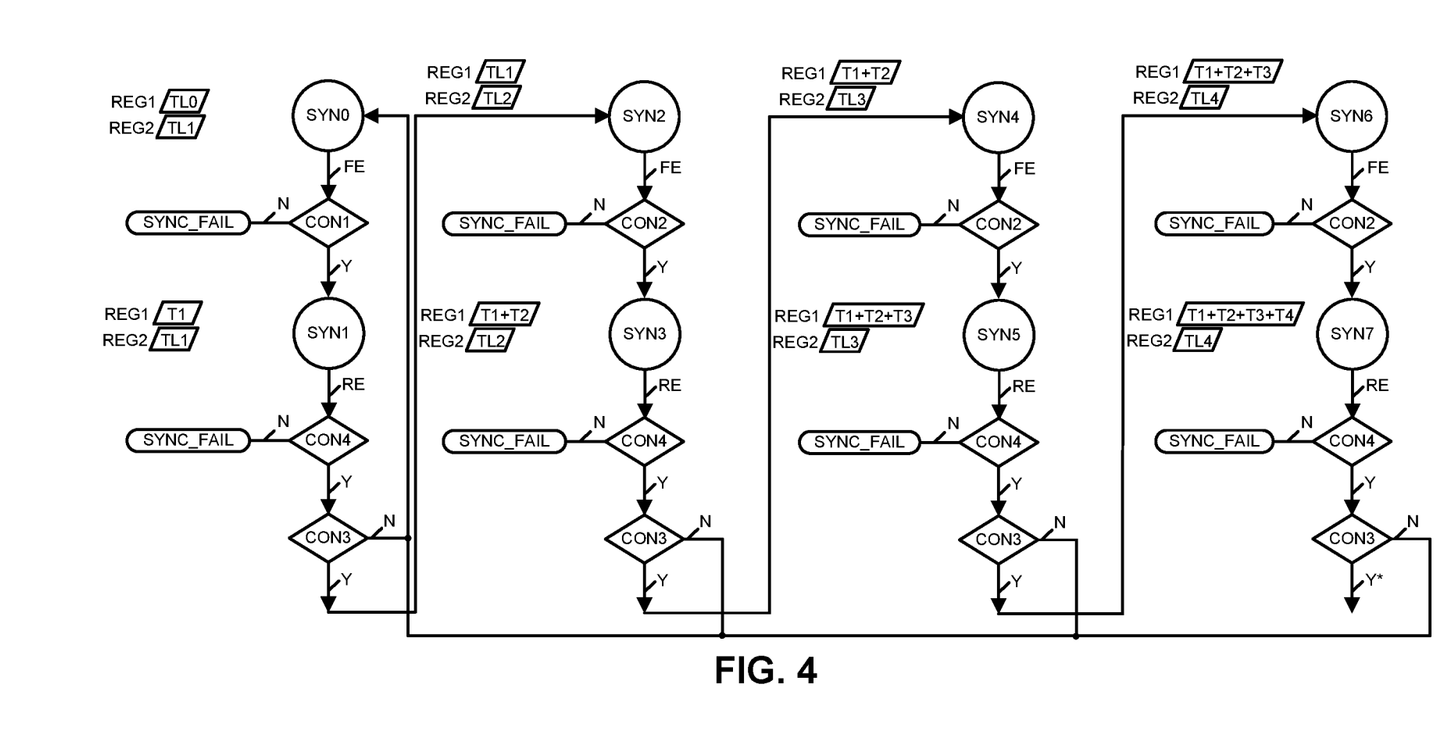
FIG. 4 is a drawing illustrating an example of synchronization (SYN) state in the state machine of FIG. 3 according to some embodiments of the present disclosure.

FIG. 3 presents a drawing illustrating an example of a state machine with state transitions using the aforementioned predefined conditions. Note that RE is the rising edge, IDLE is a default state, BREAK is a possible break received, SYN is in process of getting the sync field, and RECEIVED indicates that a valid break+sync was received. Moreover, note that the SYN state is a state machine that represents how much of the sync field is validated. FIG. 4 presents a drawing illustrating an example of SYN state in the state machine of FIG. 3.

As shown in FIG. 3, if any of the predefined conditions evaluates as a sync_fail, then the state machine may move to a BRK state, where the previously held break field value is replaced with the recently received dominant bit.

In some embodiments, the receive circuit may include a counter that counts the dominant bit and the recessive bit width in terms of number of system clocks. Moreover, there may be two registers, REG1 and REG2, that may be used to hold or store various values during the processing of received signals in order to facilitate the evaluation of the predefined conditions (such as the inequality checks) and to help determine the baud rate from the sync field when a valid 'break+sync' field is received. Notably, REG1 may hold or store the potential break field count in IDL and SYN0, while at other times it may hold or store the average two-bit time (one dominant bit and one recessive bit). Furthermore, REG2 may hold or store the last received dominant bit.

While examples of numerical values are provided in the preceding discussion, in other embodiments different numerical values are used. Consequently, the numerical values provided are not intended to be limiting.

Figure 5:
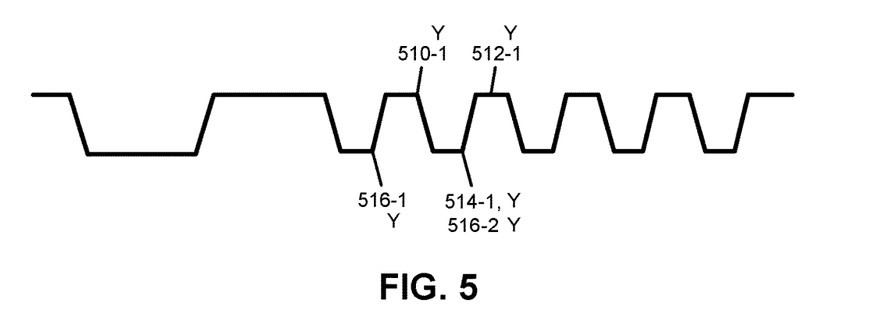
FIG. 5 is a timing diagram illustrating an example of received signals during LIN communication according to some embodiments of the present disclosure.

We now present timing diagrams with examples that illustrate various scenarios in which zero or more of the predefined conditions fail. In scenario 1, none of the predefined conditions fail (the ideal scenario). This is shown in FIG. 5, which presents a timing diagram illustrating an example of received signals during LIN communication. In FIGS. 5-9, instances of operation 510 involve checking COND1, instances of operation 512 involve checking COND2, instances of operation 514 involve checking COND3, and instances of operation 516 involve checking COND4. Note that in FIG. 5 operation 510-1 detects the break that establishes that the break field is at least 11 bit times, in operation 512-1 bit sizes are compared with bit periods and aggregated, operation 516-1 is a rough check that this dominant bit is less that the previous one and that the sequence is worth being considered as a break+sync bit of a sync field, and operations 514-1 and 516-2 are the dominant-bit comparisons to make sure they are the same size.

Figure 6:
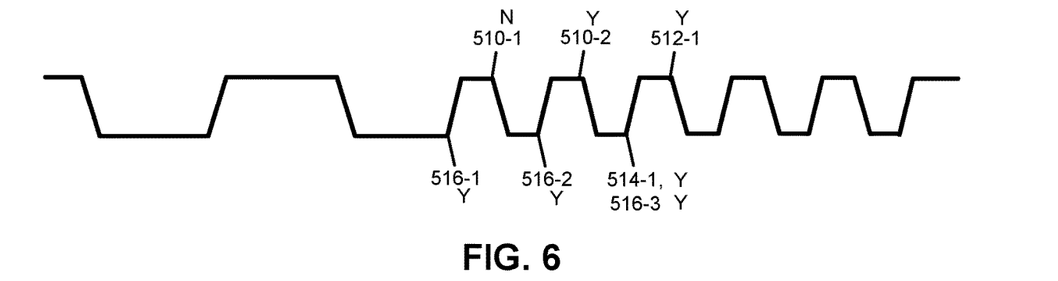
FIG. 6 is a timing diagram illustrating an example of received signals during LIN communication according to some embodiments of the present disclosure.
Figure 7:
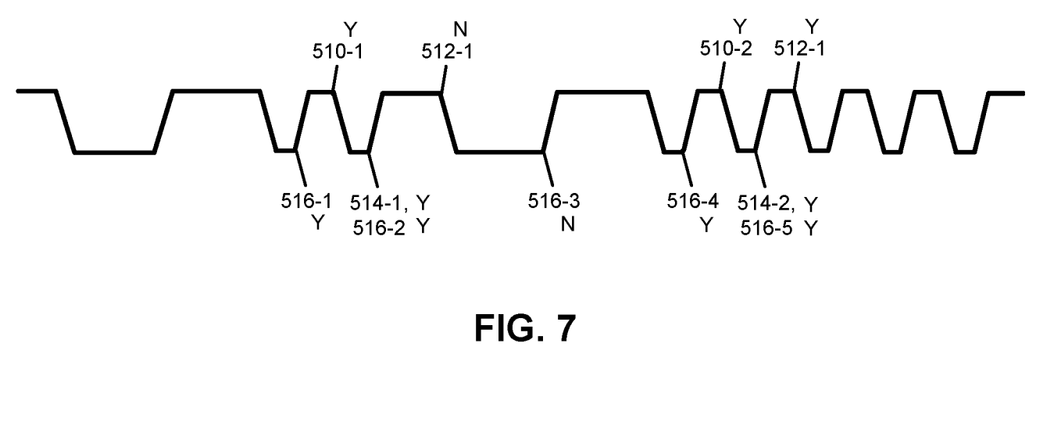
FIG. 7 is a timing diagram illustrating an example of received signals during LIN communication according to some embodiments of the present disclosure.

Moreover, in scenario 2, COND1 fails. This is shown in FIG. 6, which presents a timing diagram illustrating an example of received signals during LIN communication. Note that the failure of COND1 in operation 510-1 is essentially a sync_fail condition that takes the state machine to the BRK state, where the previous break is replaced with the recently received dominant bit.

Furthermore, in scenario 3, COND2 fails. This is shown FIG. 7, which presents a timing diagram illustrating an example of received signals during LIN communication. Note that, in operation 512-1, the failure of COND2 is essentially a snyc_fail condition that takes the state machine to the BRK state, where the previous break is replaced with the recently received dominant bit. Also note that in operation 516-3, the sync_fail condition takes the state machine to the BRK state, where the previous break is replaced with the recently received dominant bit.

Figure 8:
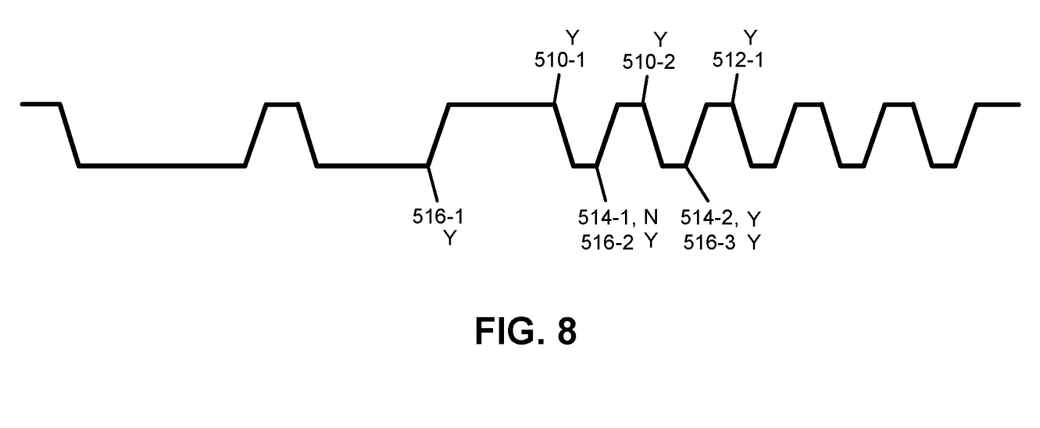
FIG. 8 is a timing diagram illustrating an example of received signals during LIN communication according to some embodiments of the present disclosure.

Additionally, in scenario 4, COND3 fails. This is shown in FIG. 8, which presents a timing diagram illustrating an example of received signals during LIN communication. In operation 514-1, the failure of COND3 takes the state machine to state SYN0, where the previous dominant bit becomes the break and the current dominant bit acts as the start bit of the sync field.

Figure 9:
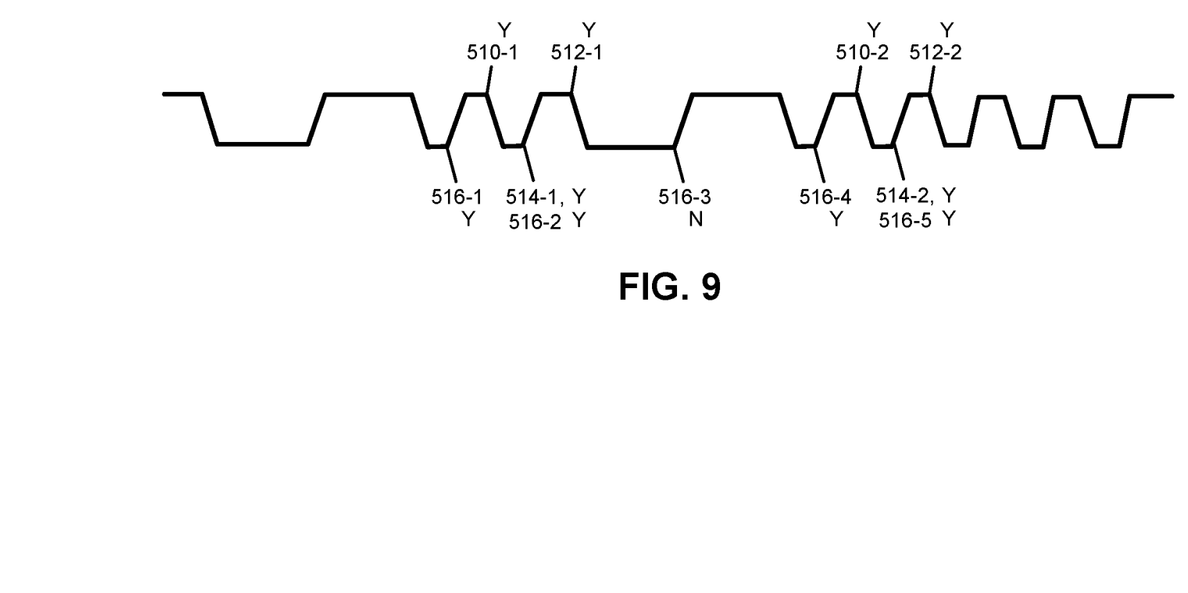
FIG. 9 is a timing diagram illustrating an example of received signals during LIN communication according to some embodiments of the present disclosure.

In scenario 5, COND4 fails. This is shown in FIG. 9, which presents a timing diagram illustrating an example of received signals during LIN communication. In operation 516-3, the failure of COND4 is a synch fail condition that takes the state machine to the BRK state, where the previous break is relaced with the recently received dominant bit.

Figure 10:
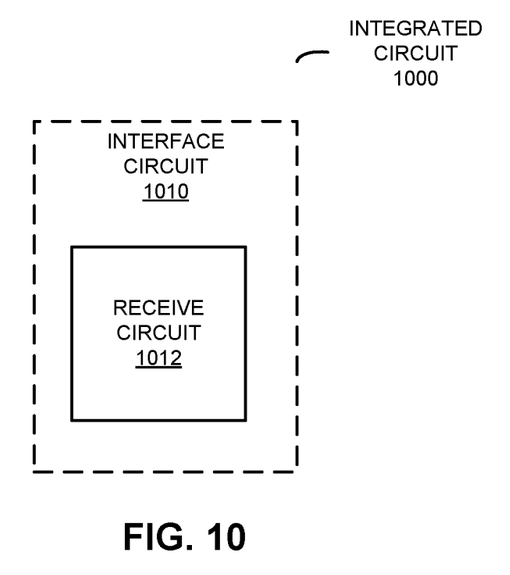
FIG. 10 is a block diagram illustrating an example of an integrated circuit according to some embodiments of the present disclosure.

As discussed previously, an integrated circuit may, at least in part, perform the circuit techniques. Notably, FIG. 10 presents a block diagram illustrating an example of an integrated circuit 1000. This integrated circuit may include an interface circuit 1010 that includes receive circuit 1012. In some embodiments, receive circuit 1012 may include: an analog front end (such as a pre-amplifier); an analog-to-digital converter (ADC); one or more detection channels that implement one or more detection techniques; a clock; and control logic that configures and manages detection circuit. Note that there may be dedicated detection channels in the one or more detection channels for measurements performed by a given integrated circuit. Alternatively or additionally, the one or more detection channels may be shared when analyzing measurements performed by different integrated circuits.

Note that FIG. 10 does not illustrate all of the connections between the components. Moreover, integrated circuit 1000 may include: fewer or additional components; two or more components may be combined; a single component may be split into two or more components; and/or positions of one or more components may be changed.

Figure 11:
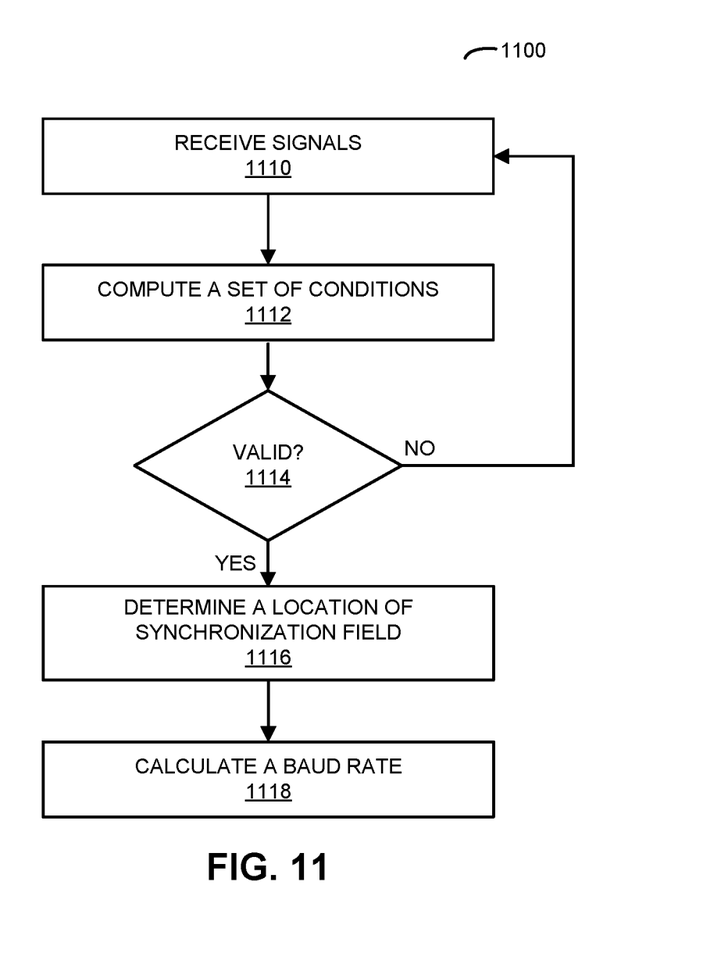
FIG. 11 is a flow diagram illustrating an example of a method for selectively calculating a baud rate of received signals according to some embodiments of the present disclosure.

We now describe embodiments of a method. FIG. 11 presents a flow diagram illustrating an example of a method 1100 for selectively calculating a baud rate of received signals. This method may be performed by an integrated circuit, such as an interface circuit.

During operation, the interface circuit may receive the signals (operation 1110) corresponding to a header of a frame that is compatible with a serial communication protocol, where the received signals comprise a temporal pattern of binary bits with instances of a dominant signal level and a recessive signal level. Then, the interface circuit may compute a set of conditions (operation 1112) based at least in part on the receive signals, where, when valid, the set of conditions identify a first dominant bit in the binary bits having the dominant signal level. Moreover, when the set of conditions are valid (operation 1114), the interface circuit may: determine a location of synchronization field (operation 1116) in the header relative to the identified first dominant bit; and calculate the baud rate (operation 1118) of the receive signals based at least in part on a subset of the binary bits in the synchronization field. Otherwise (operation 1114), the interface circuit may perform revert to operation 1110.

In some embodiments of the method 1100, there may be additional or fewer operations. Moreover, the order of the operations may be changed, and/or two or more operations may be combined into a single operation.

The disclosed integrated circuit and the circuit techniques can be (or can be included in) any electronic device or system. For example, the electronic device may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, a camera or image sensor, an access point, a router, a switch, communication equipment, test equipment, a vehicle, a drone, a ship, an airplane, a car, a truck, a bus, a motorcycle, manufacturing equipment, farm equipment, construction equipment, or another type of electronic device.

Although specific components are used to describe the embodiments of the integrated circuit, in alternative embodiments different components and/or subsystems may be present in the integrated circuit. Thus, the embodiments of the integrated circuit may include fewer components, additional components, different components, two or more components may be combined into a single component, a single component may be separated into two or more components, one or more positions of one or more components may be changed, and/or there may be different types of components.

Moreover, the circuits and components in the embodiments of the integrated circuit may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar. Note that electrical coupling or connections in the preceding embodiments may be direct or indirect. In the preceding embodiments, a single line corresponding to a route may indicate one or more single lines or routes.

As noted previously, an integrated circuit may implement some or all of the functionality of the circuit techniques. This integrated circuit may include hardware and/or software mechanisms that are used for implementing functionality associated with the circuit techniques.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the circuit techniques may be implemented using program instructions that are executed by a processor or in firmware in an integrated circuit.

Moreover, while examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
an interface circuit, wherein the interface circuit is configured to:
receive signals corresponding to a header of a frame that is compatible with a serial communication protocol, wherein the received signals comprise a temporal pattern of binary bits with instances of a dominant signal level and a recessive signal level;
compute a set of conditions based at least in part on the received signals, wherein, when valid, the set of conditions identify a first dominant bit in the binary bits having the dominant signal level, wherein the set of conditions comprises a first instance of a first condition, wherein, when valid, the first instance of the first condition comprises that a second dominant bit time of a second dominant bit in the binary bits having the dominant signal level is less than or equal to a first predefined multiple of a first dominant bit time of the first dominant bit, and wherein the first dominant bit precedes the second dominant bit; and
when the set of conditions are valid:
determine a location of synchronization field in the header relative to the identified first dominant bit; and
calculate a baud rate of the received signals based at least in part on a subset of the binary bits in the synchronization field.

2. The integrated circuit of claim 1, wherein the serial communication protocol comprises a Local Interconnect Network (LIN) communication protocol.

3. The integrated circuit of claim 1, wherein the dominant signal level is less than the recessive signal level.

4. The integrated circuit of claim 1, wherein the first predefined multiple comprises 1.25.

5. The integrated circuit of claim 1, wherein the set of conditions comprises a second condition; and
wherein, when valid, the second condition comprises that a sum of the second dominant bit time and a first recessive bit time of a first recessive bit in the binary bits having the recessive signal level is greater than or equal to a second predefined multiple of the first dominant bit time; and
wherein the first recessive bit is between the first dominant bit and the second dominant bit.

6. The integrated circuit of claim 5, wherein the second predefined multiple comprises a ratio of 2 and 11.

7. The integrated circuit of claim 5, wherein the set of conditions comprises a second instance of the first condition;
wherein, when valid, the second instance of the first condition comprises that a third dominant bit time of a third dominant bit in the binary bits having the dominant signal level is less than or equal to the first predefined multiple of the second dominant bit time of the second dominant bit; and
wherein the second dominant bit precedes the third dominant bit.

8. The integrated circuit of claim 7, wherein the set of conditions comprises a third condition;
wherein, when valid, the third condition comprises that the third dominant bit time is greater than or equal to a third predefined multiple of the second dominant bit time.

9. The integrated circuit of claim 8, wherein the third predefined multiple comprises 0.75.

10. The integrated circuit of claim 9, wherein the first predefined multiple comprises 1.25 and the third predefined multiple comprises 0.75.

11. The integrated circuit of claim 8, wherein the set of conditions comprises a fourth condition;
wherein, when valid, the fourth condition comprises that a sum of a second recessive bit time of a second recessive bit in the binary bits and the third dominant bit time is greater than or equal to the third predefined multiple of an average bit time of a pair of bits in the binary bits, and the sum is less than or equal to the first predefined multiple of the average bit time;
wherein the third dominant bit precedes the second recessive bit; and
wherein the pair of bits comprises the first recessive bit and a dominant bit selected from the group comprising the first dominant bit, the second dominant bit and the third dominant bit.

12. A non-transitory computer-readable storage medium for use in conjunction with an electronic device, the computer-readable storage medium storing program instructions, wherein, when executed by the electronic device, the program instructions cause the electronic device to perform one or more operations, comprising:
receiving signals corresponding to a header of a frame that is compatible with a serial communication protocol, wherein the received signals comprise a temporal pattern of binary bits with instances of a dominant signal level and a recessive signal level;
computing a set of conditions based at least in part on the received signals, wherein, when valid, the set of conditions identify a first dominant bit in the binary bits having the dominant signal level, wherein the set of conditions comprises a first instance of a first condition, wherein, when valid, the first instance of the first condition comprises that a second dominant bit time of a second dominant bit in the binary bits having the dominant signal level is less than or equal to a first predefined multiple of a first dominant bit time of the first dominant bit, and wherein the first dominant bit precedes the second dominant bit; and
when the set of conditions are valid:
determining a location of synchronization field in the header relative to the identified first dominant bit; and
calculating a baud rate of the received signals based at least in part on a subset of the binary bits in the synchronization field.

13. The non-transitory computer-readable storage medium of claim 12, wherein the serial communication protocol comprises a Local Interconnect Network (LIN) communication protocol.

14. The non-transitory computer-readable storage medium of claim 12, wherein the dominant signal level is less than the recessive signal level.

15. The non-transitory computer-readable storage medium of claim 12, wherein the set of conditions comprises a second condition; and
wherein, when valid, the second condition comprises that a sum of the second dominant bit time and a first recessive bit time of a first recessive bit in the binary bits having the recessive signal level is greater than or equal to a second predefined multiple of the first dominant bit time; and wherein the first recessive bit is between the first dominant bit and the second dominant bit.

16. A method for selectively calculating a baud rate of received signals, comprising:

by an electronic device:

receiving the signals corresponding to a header of a frame that is compatible with a serial communication protocol, wherein the received signals comprise a temporal pattern of binary bits with instances of a dominant signal level and a recessive signal level;

computing a set of conditions based at least in part on the received signals, wherein, when valid, the set of conditions identify a first dominant bit in the binary bits having the dominant signal level, wherein the set of conditions comprises a first instance of a first condition, wherein, when valid, the first instance of the first condition comprises that a second dominant bit time of a second dominant bit in the binary bits having the dominant signal level is less than or equal to a first predefined multiple of a first dominant bit time of the first dominant bit, and wherein the first dominant bit precedes the second dominant bit; and when the set of conditions are valid:

determining a location of synchronization field in the header relative to the identified first dominant bit; and calculating the baud rate of the received signals based at least in part on a subset of the binary bits in the synchronization field.

17. The method of claim 16, wherein the serial communication protocol comprises a Local Interconnect Network (LIN) communication protocol.

18. The method of claim 16, wherein the dominant signal level is less than the recessive signal level.

19. The method of claim 16, wherein the set of conditions comprises a second condition; and wherein, when valid, the second condition comprises that a sum of the second dominant bit time and a first recessive bit time of a first recessive bit in the binary bits having the recessive signal level is greater than or equal to a second predefined multiple of the first dominant bit time; and wherein the first recessive bit is between the first dominant bit and the second dominant bit.

20. The method of claim 16, wherein the set of conditions comprises a second instance of the first condition;

wherein, when valid, the second instance of the first condition comprises that a third dominant bit time of a third dominant bit in the binary bits having the dominant signal level is less than or equal to the first predefined multiple of the second dominant bit time of the second dominant bit; and wherein the second dominant bit precedes the third dominant bit.

* * * * *